Aug. 16, 1949.    G. S. WING    2,478,993
FLOORING OR SURFACING STRUCTURE
Filed July 1, 1946
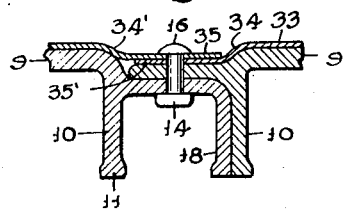
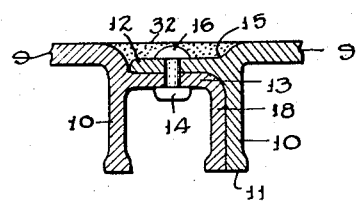
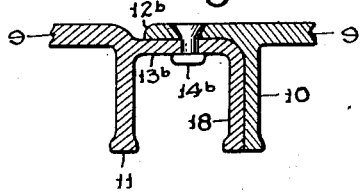
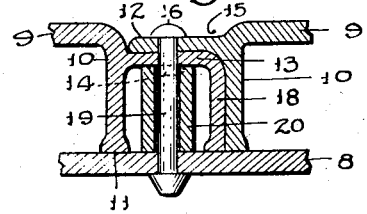
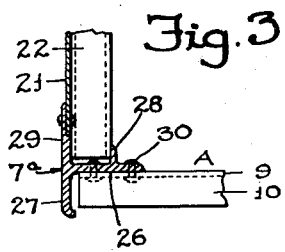
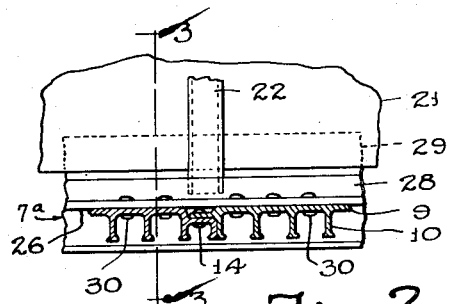
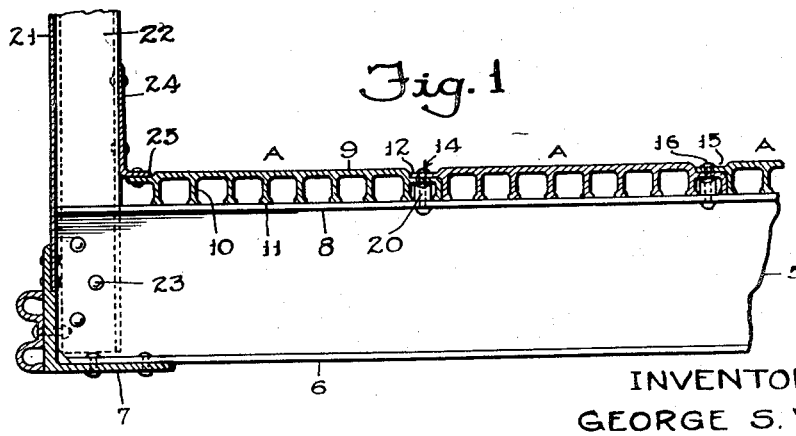
INVENTOR
GEORGE S. WING Patented Aug. 16, 1949

2,478,993

UNITED STATES PATENT OFFICE 2,478,993

FLOORING OR SURFACING STRUCTURE

George S. Wing, Hermosa Beach, Calif.

Application July 1, 1946, Serial No. 680,803

5 Claims. (Cl. 296—28)

This invention relates to load bearing surfacing structures. The invention is specifically applicable to flooring in vehicles, particularly of the type exemplified in the large commercial trucks, trailers, railway cars, etc.

The floor of a commercial freight vehicle of the type employed in hauling large and heavy articles must, in order to meet the requirements of such use, embody a number of important characteristics. It must present a smooth floor surface along which articles can be slid during loading and unloading operations. This surface should be free of projections against which such articles might catch while being slid along the floor. The floor surface must be level. It must be solid and rigid—free from sagging. It must be capable of withstanding wear over extended periods of time.

Coupled with the above stated characteristics, however, a flooring of this type should be so constructed that it can be readily assembled from easily handled sections. It should be possible to remove and replace these sections without excessive difficulty. At the same time, the sections, when secured together, should form a unitary, rigid flooring structure.

One of the important objects of my invention is to provide a structural surfacing and load bearing unit adapted to be secured to like units in a manner avoiding any projection of bolt or rivet heads above the composite surface defined by said units. Another object is to provide a structural unit adapted to be secured to like units in a manner providing extreme rigidity for the entire structure.

Another object of my invention is to provide a structural unit for surfacing purposes, having a maximum ratio of load bearing strength to weight, and having means whereby it may be connected to adjoining like members so as to form a substantially continuous surfacing wall having integral load bearing flanges adapted to rest upon spaced supporting members.

Another object of my invention is to provide a surfacing and load bearing unit adapted to be secured to like units so as to constitute not only the flooring but also a substantial portion of the frame structure of a vehicle such as a freight transport trailer. In this respect, the invention contemplates the employment of a series of structural units which, when secured together, will provide a floor structure of such rigidity in its own plane as to impart to the entire vehicle body an adequate resistance to the deforming tendency of stresses and strains acting in the horizontal plane of the chassis of the vehicle. It is contemplated that a vehicle body embodying my improved flooring will maintain an accurate rectangular horizontal cross section, and will not be twisted into a parallelogram shape by horizontal moments in the chassis.

A further object of the invention is to provide a structural member which, when joined to a series of like structural members, will present a surface capable of being readily transformed into a smooth, flat, unbroken surface.

Other objects will become apparent in the ensuing specifications and appended drawings in which:

Fig. 1 is a transverse sectional view through a portion of a vehicle body embodying the invention;

Fig. 2 is a sectional view of a typical surfacing structure embodying the invention;

Fig. 3 is a sectional view of the same taken on the line 3—3 of Fig. 2;

Fig. 4 is a detail sectional view of a joint in accordance with the invention;

Fig. 5 is a detail sectional view of a joint embodying the invention; and

Figs. 6 and 7 are detail sectional views of joints embodying additional modifications of the invention.

As an example of one form in which the invention may be embodied, I have shown in Fig. 1 a portion of freight transport trailer embodying a plurality of transverse floor beams 5, each having a lower flange 6 resting upon a longéron 7, and each having an upper flange 8 upon which is supported the improved floor structure of my invention.

My improved surfacing structure comprises a plurality of flooring sections A each having a surfacing wall 9 and a plurality of integral load carrying flanges 10 normal thereto and extending in spaced relation, parallel to the sides thereof. The lower edges 11 of the flanges 10 lie in a common plane and are adapted to each make bearing contact with a supporting member such as the flange 8.

Along one side of each floor section A is a flange 12 which is parallel to the surfacing wall 9 but is offset downwardly therefrom. Along the other side of each floor section A is a projecting hip 13 which is also parallel to the surfacing wall 9 but offset downwardly therefrom farther than the offsetting of the flange 12 by the thickness of the latter. This is to provide for fitting the flange 12 over the hip 13. The flange 12 and hip 13 are secured together by securing elements 14. The offsetting of the flanges 12 provides, in the assembled flooring, longitudinal channels 15 in which the heads 16 of the securing elements 14 are accommodated below the upper surface of the flooring. The securing elements 14 may be in the form of rivets or bolts of various kinds.

Each hip 13 terminates in a flange 18 extending parallel to the flanges 10 and adapted to seat against the terminal flange 10 of the opposite side of the adjacent flooring section. This seating of the flanges 10 and 18 in engagement with each other provides for side to side bearing engagement of adjacent flooring sections which, coupled with the securing of the flange 12 and hip 13 together by the securing elements 14, makes the assembled floor structure extremely rigid in its own plane, and resists the deforming tendency of shear stresses and other stresses and strains imposed in this longitudinal plane. In addition, the interengagement of the flanges 10 and 18 resists upward buckling of adjacent flooring sections. In this connection, it may be noted that where the flooring sections cross the floor beams 5 they are tied down to the flanges 8 by longer securing elements 19 each extending through flange 12 and hip 13, a spacer collar 20, and the flange 8. The floor beams 5 will, however, ordinarily be considerably spaced apart in the vehicle (e. g. from 4 to 6 feet) and intermediate the beams 5, the flooring sections will depend upon the interengagement of the flanges 12 and 13 and the flanges 10 and 18 to resist upward buckling, and will depend upon the reinforcing function of the flanges 10 to resist downward sagging under the loads carried by the floor. In this connection, it will be apparent that the flanges 10 will act in tension to absorb the downward loads.

In addition to resisting upward buckling, the engagement of the flanges 10 and 18 in cooperation with the flange 12 and hip 13 and the securing elements 14 resists twisting moments in the plane of the flooring. The rigidity in its own plane which is thus imparted to the assembled floor structure makes it possible to utilize this structure as a part of the frame structure of the vehicle body, making the body so completely rigid in itself that the longérons 7 need function only to support the weight of the body. That is, the vehicle body is a self-contained rigid structure which does not depend for rigidity upon the vehicle chassis. The body may be constructed to include the floor beams 5, the flooring A, and the side wall skin 21 which may have its lower extremity recessed into the vertical flange of the longéron 7 and be secured to vertical stiffeners or posts 22 that are secured at 23 to the beams 5.

Kick strips 24, having at their lower edges horizontal flanges 25, are secured to the inner sides of the posts 22, with the flanges 25 accommodated in the recesses defined by the flanges 12 and 13 of the marginal floor sections A. These recesses make it possible to tie the kick strips directly to the marginal floor sections and yet have the flanges 25 by which such tying is effected, disposed below or flush with the floor surface.

The rivet heads 16, being recessed below the surface of the flooring, will not interfere with the sliding of articles over the floor. At the same time, the rivets are not weakened by blows from articles slid along the floor, and do not become loosened from this cause.

Fig. 1 illustrates a construction in which the flooring extends longitudinally. Figs. 2 and 3 illustrate how the flooring may extend transversely. A longéron 7a has a horizontal flange 26, a flange 27 depending below the flange 26 to conceal the ends of the flooring sections A, and a flange 28 rising from the flange 26 and spaced from the main vertical flange 29 to receive the lower ends of the posts 22a. The flooring sections in this case are hung beneath the flange 26, being secured thereto as at 30. The flange 28 may function as a kick strip.

If desired, a uniformly smooth floor surface may be attained by filling the channels 15 with plastic material 32 (Fig. 5) capable of being melted and poured into the channels. A material adapted to become fairly hard and tough upon cooling, may be employed.

Another method of attaining a continuous, smooth floor surface is to employ a modified form of floor section, shown in Fig. 6, wherein the flange 12b is flush with the flooring wall 9 and the hip 13b is correspondingly higher than the flange 13.

The flange 12b and hip 13b are joined by countersunk rivets 14b to provide a substantially continuous flush surface.

In order to obtain maximum strength coupled with minimum weight, the invention contemplates constructing the flooring in the form of extruded sections, preferably of a light metal compound such as Duralumin. Such a material is, however, subject to abrasion, and where it is used it may be desirable to face it with wear-resistant sheet material such as sheet steel 33 (Fig. 7). Such facing sheets may be offset as at 34 and 34' along their edges and terminate in flanges 35 and 35' adapted to overlap each other and be tied down by rivets 14 extending therethrough.

In addition to its use in flooring structure, the invention also may be used in other structures where a smooth continuous surface, combined with load bearing characteristics, is desired. For example, sections of my improved surfacing structure may be joined together to form the skin of an airplane. In such a structure, the skin and longitudinal bracing structure can be combined in the surfacing sections, attached directly to the wing ribs (corresponding to the joists 5). The flanges 10, extending longitudinally, will eliminate the necessity for the secondary stringers of the wing structure. A wing structure may be greatly simplified in this manner.

Other uses of my improved structural member in constructions requiring a smooth surface on one side and considerably inherent rigidity load bearing capacity, are possible. The invention may be utilized in any type of floor structure, either in vehicles or stationary buildings. Other uses will be apparent from the foregoing specifications.

I claim as my invention:

1. A vehicle floor structure having a high degree of rigidity in its own plane and functioning both as a floor and as a component of frame structure, said floor structure comprising: a plurality of transverse supports; a number of elongated flooring sections each consisting in a plurality of integrally united members all extending longitudinally, said members including a horizontal surfacing wall, a plurality of laterally spaced load bearing flanges extending downwardly, their lower edges resting on said supporting means, a connecting flange projecting laterally from one side of each flooring section, and a hip member joining the two load bearing flanges at the other side of each flooring section, said hip members being offset below the upper surface of said sections so as to lie beneath the plane of the connecting flanges of the respective adjoining sections; and securing elements extending through the overlapped flanges and hip members and joining the flooring sections together, some of said securing elements extending the full depth of the flooring sections and attached to said transverse support.

2. A floor structure as defined in claim 1, wherein the outer load bearing flange of the two flanges joined by said hip member is abutted against the outer flange of the other side of an adjoining flooring section so as to transmit lateral support between the sections.

3. A vehicle floor structure having a high degree of rigidity in its own plane and functioning both as a floor and as a component of frame structure, said floor structure comprising: a plurality of transverse supports; a number of elongated flooring sections each consisting in a plurality of integrally united members all extending longitudinally, said members including a horizontal surfacing wall, a plurality of laterally spaced load bearing flanges extending downwardly, the lower edges resting on said transverse support, a connecting flange projecting laterally from one side of each flooring section, parallel to and offset below the upper surface of the section, and a hip member joining the two load bearing flanges at the other side of each flooring section, said hip member being offset below the upper surface of the section a distance equal to the offset depth plus the thickness of a connecting flange, each connecting flange overlapping the hip member of an adjoining unit; securing elements extended through the overlapped flanges and hip members and securing them together; and a number of longer securing elements extending through the overlapped flanges and hip members and attached to said transverse supports for uniting the flooring sections and transverse supports in a unitary strain resisting structure, said connecting flanges cooperating with the side extremities of adjacent surfacing walls to define channels in which the heads of said securing elements are accommodated below the upper surface of the floor structure.

4. A surfacing structure for a vehicle subject to high stresses when in motion, said surfacing structure having a high degree of rigidity in its own plane and functioning both as a surfacing means and as a component of frame structure, said surfacing structure comprising; a plurality of transverse supports; a number of elongated surfacing units of extruded light metal section each consisting in a plurality of integrally united members all extending longitudinally, said members including a surfacing wall, a plurality of parallel load bearing flanges extending normally to said wall, their extremities crossing and bearing against said supports, a connecting flange projecting laterally from one side of each surfacing section parallel to and offset below a surface thereof, and a hip member joining the two load bearing flanges at the other side of each surfacing section, said hip member being offset below the surface of said surfacing walls a distance equal to the offset depth plus the thickness of the connecting flange, each connecting flange overlapping the hip member of an adjoining section; securing elements extended through the overlapping flanges and hip members and securing them together, and longer securing elements extending through the overlapping flanges and hip members and attached to said transverse supports, the outer load bearing flange of the two flanges joined by said hip member being in abutting engagement with the outer flange of the other side of the adjoining section, whereby to transmit lateral support between the sections, the supporting flanges cooperating with the side extremities of the adjacent surfacing walls to define channels, and said securing elements having heads accommodated in said channels below the surface of said surfacing structure.

5. An elongated structural unit of extruded metal section adapted to form a component part of a surfacing structure having a high degree of rigidity in its own plane and functioning both as a surfacing means and as a component of frame structure in a vehicle subjected to high stresses when in motion, said structural unit comprising: a plurality of integrally united members all extending longitudinally substantially full length of the section, said members each including a surfacing wall, a plurality of parallel load bearing flanges extending normal to said surfacing wall, their extremities adapted for engagement with a support, a connecting flange extending laterally from one side of the section and offset below the surface of the surfacing wall so as to define with side extremities of adjacent surfacing walls, a channel for reception of a securing element head, and a hip member joining outer load bearing flanges at the other side of the section, said hip member being offset below the surface of the section to a depth equal to the offset depth of said connecting flange plus the thickness thereof, said offset flange being adapted to overlap the hip member of an adjoining section, said offset flange and hip member having openings which register with corresponding openings of the overlapping hip member and flange of adjoining sections so as to receive securing elements for joining the sections together and the outer flange of the two flanges joined by the hip member being positioned to make abutting engagement with the outer flange from the other side of an adjoining section, whereby to provide for the lateral transmission of loads between the sections.

GEORGE S. WING.

REFERENCES CITED

The following references are of record in the file of this patent:

UNITED STATES PATENTS

| Number | Name | Date |
| --- | --- | --- |
| 1,575,677 | Farmer | Mar. 9, 1926 |
| 1,967,620 | Kahn | July 24, 1934 |
| 2,148,858 | Freeman et al. | Feb. 28, 1939 |

FOREIGN PATENTS

| Number | Country | Date |
| --- | --- | --- |
| 743,461 | France | 1933 |
| 747,177 | France | 1933 |